US007066804B2

(12) United States Patent
Sawhill et al.

(10) Patent No.: US 7,066,804 B2
(45) Date of Patent: Jun. 27, 2006

(54) METHOD AND APPARATUS FOR LOADING DIFFERENT SIZED CASINGS ONTO THE STUFFING TUBE OF A SAUSAGE MAKING MACHINE

(75) Inventors: Matthew P. Sawhill, Des Moines, IA (US); Kenneth L. Lebsack, Ankeny, IA (US)

(73) Assignee: Stork Townsend Inc., Des Moines, IA (US)

( * ) Notice: Subject to any disclaimer, the term of this patent is extended or adjusted under 35 U.S.C. 154(b) by 370 days.

(21) Appl. No.: 10/443,245

(22) Filed: May 22, 2003

(65) Prior Publication Data

US 2004/0038636 A1   Feb. 26, 2004

Related U.S. Application Data

(63) Continuation-in-part of application No. 10/225,389, filed on Aug. 21, 2002, now abandoned.

(51) Int. Cl.
*A22C 11/00* (2006.01)

(52) U.S. Cl. .......................................... 452/34; 452/32

(58) Field of Classification Search .................. 452/30, 452/31, 32, 33, 34, 39, 40

See application file for complete search history.

(56) References Cited

U.S. PATENT DOCUMENTS

| 432,173 | A | * | 7/1890 | Wilder | 452/33 |
| 3,672,001 | A | * | 6/1972 | Greider | 452/31 |
| 4,434,527 | A | * | 3/1984 | Staudenrausch et al. | 452/34 |
| 5,092,814 | A | * | 3/1992 | Kasai et al. | 452/47 |

FOREIGN PATENT DOCUMENTS

JP           2-286036        * 11/1990

* cited by examiner

*Primary Examiner*—Peter M. Poon
*Assistant Examiner*—David Parsley

(57) ABSTRACT

A casing hopper for sausage encasing machines includes a hopper. The hopper is adjustable for different sized casings by a single control.

17 Claims, 9 Drawing Sheets

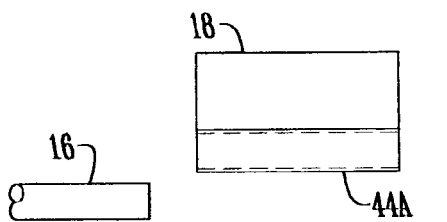
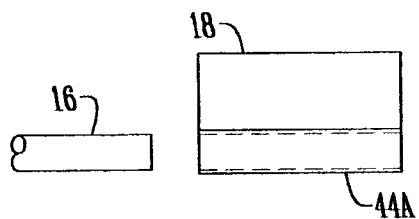
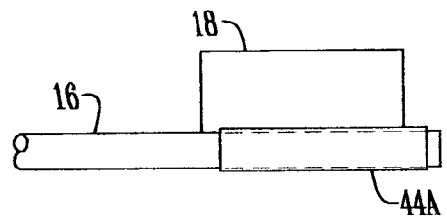
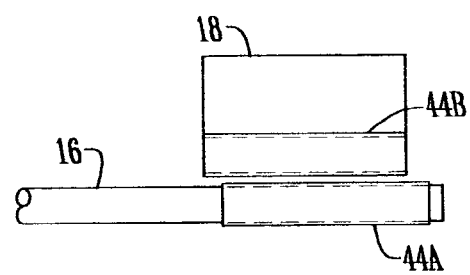
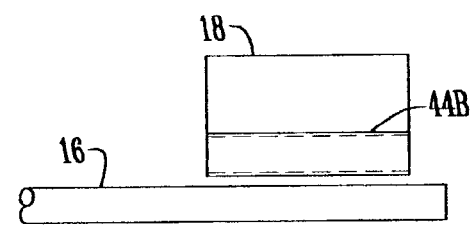
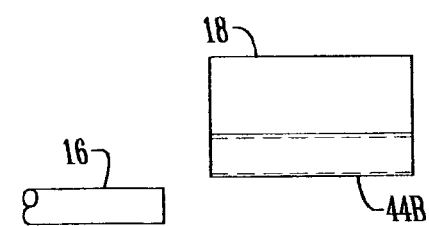
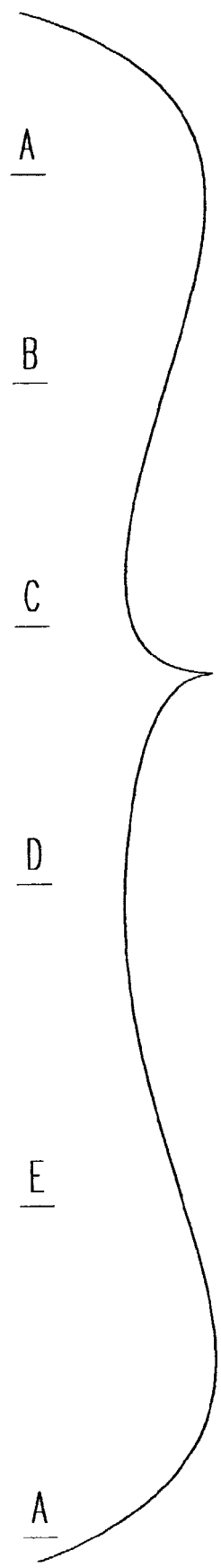
Fig. 7

METHOD AND APPARATUS FOR LOADING DIFFERENT SIZED CASINGS ONTO THE STUFFING TUBE OF A SAUSAGE MAKING MACHINE

CROSS REFERENCE TO RELATED APPLICATION

This application is a continuation-in-part of U.S. patent application Ser. No. 10/225,389 filed Aug. 21, 2002 now abandoned.

BACKGROUND OF THE INVENTION

Sausage linking machines form long strands of sausage links. The links are created by stuffing a cylindrical thin wall casing with meat emulsion, and then portioning the filled casing to create the individual links. The casing material comes in the form of cylindrical sticks (called casings) that must be loaded into the sausage machines. When one casing is consumed, another must be loaded in its place. The casings are thirty feet or more in length but are compressed to a shirred telescopic condition so as to form a shirred casing of ten or twelve inches in length. When placed on a meat stuffing tube of the machine, the meat emulsion is extruded through a discharge end of the tube into the casing, which is progressively slidably removed from the outer surface of the tube as it is progressively being filled with meat emulsion. A clamping mechanism is typically used to release the shirred casings from the hopper into a position where they can be filled sequentially with meat emulsion.

A previous invention provided an improved method and apparatus for loading casings onto the stuffing tube of a sausage making machine, without the use of clamps or the like.

The principal object of this patent is to provide a method and apparatus for easily adjusting a casing hopper to load different diameters of casings onto the stuffing tube of a sausage making machine.

A further object is to do this by the action of just one lever.

A further object is to calibrate this adjustment so that the hopper can be set up prior to running the machine without testing with a casing These and other objects will be apparent to those skilled in the art.

SUMMARY OF THE INVENTION

A casing hopper moves so that the lowest casing in the hopper is aligned with the stuffing tube of a sausage encasing machine. The stuffing tube penetrates the casing and the casing hopper moves back to its first position, leaving the casing on the stuffing tube to be conventionally filled with meat emulsion from the discharge end of the stuffing tube whereupon the casing is sequentially and progressively removed from the stuffing tube. The stuffing tube then is longitudinally withdrawn back to its starting position whereupon the hopper is again realigned with the stuffing tube so as to permit the stuffing tube to penetrate the next casing in the cradle.

This casing hopper for sausage encasing machines includes a hopper having a downwardly sloping bottom terminating in a downwardly extending fence wall. A chute wall is substantially vertically disposed in parallel spaced condition to the fence wall to form a substantially vertical casing passageway with respect to the fence wall. The chute wall terminates in an inclined flange that extends upwardly and inwardly below the passageway to form a cradle portion to receive a single hollow casing from the passageway.

The passageway is of sufficient width to receive a plurality of vertically stacked elongated hollow shirred casings.

When a casing is aligned with the stuffing tube, the stuffing tube is moved longitudinally to penetrate the casing in the cradle so as to mount the casing on the outer surface of the stuffing tube. The cradle is moved out of alignment with the stuffing tube leaving the first casing in the loading position on the stuffing tube, whereupon a second casing drops into the cradle.

The flange on the chute wall terminates in an elongated inward edge spaced from a lower end of the fence wall to permit only the lowest casing in the cradle to be moved laterally outwardly relative to the hopper from the flange beneath the fence, when it is on the stuffing tube and the hopper moves away from the stuffing tube position.

BRIEF DESCRIPTION OF THE DRAWINGS

FIG. 7 is a schematic view showing the progressive steps of using the device of the invention;

FIG. 8 and FIG. 9 are superimposed over the axis of the stuffing tube, showing how the chute wall and the fence wall must move to run small and large casings.

DESCRIPTION OF THE PREFERRED EMBODIMENT

Figure 1:
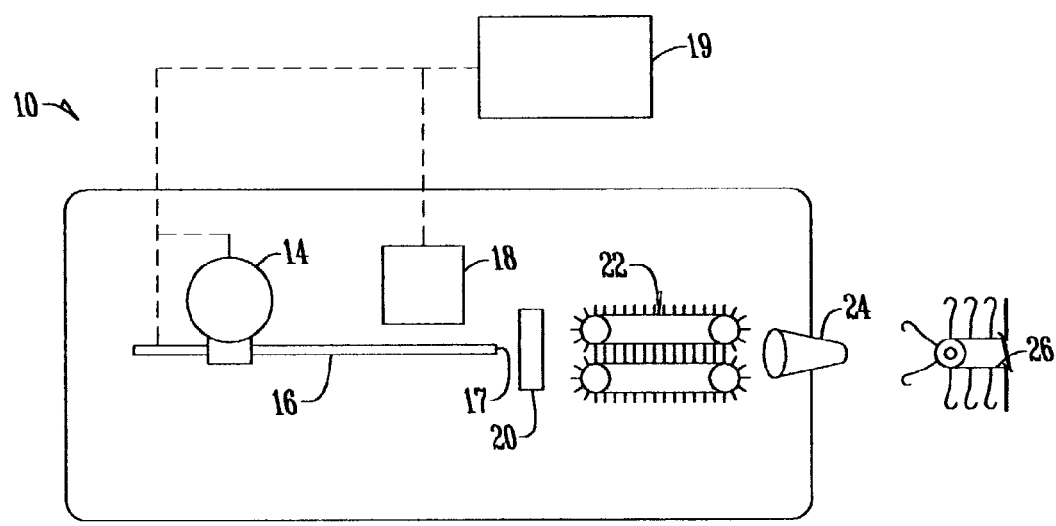
FIG. 1 is a schematic plan view showing a sausage encasing machine with the hopper of this invention.
Figure 2:
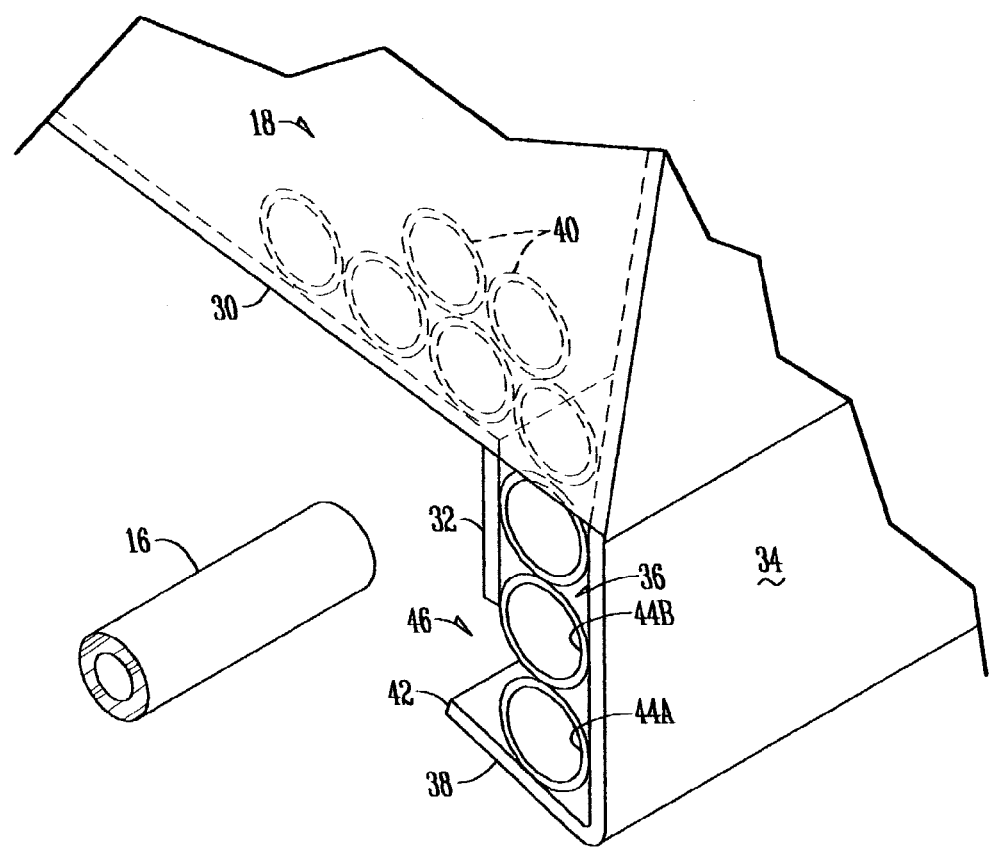
FIG. 2 is a partial perspective view of the lower part of the hopper and a closely positioned stuffing tube.

With reference to FIG. 1, a sausage encasing machine 10 has a frame 10. A meat emulsion pump 14 is mounted on the frame. A conventional stuffing tube 16 is mounted on the machine 10 in operative connection with the pump to transmit meat emulsion from the pump into the casing as will be described hereafter. The numeral 17 designates the discharge end of the tube.

A casing hopper 18 is mounted on the frame in any convenient manner. A controller 19 is mounted on or adjacent to the machine 10 and is operatively connected to various components on the machine including the hopper 18, the pump 14, and the longitudinally movable stuffing tube 16.

A conventional twister 20 is located downstream from the stuffing tube as is a conventional sausage strand linker 22. A conventional discharge horn 24 is located downstream of the linker to deposit linked sausage in a conventional manner to conveyor 26.

Figure 3:
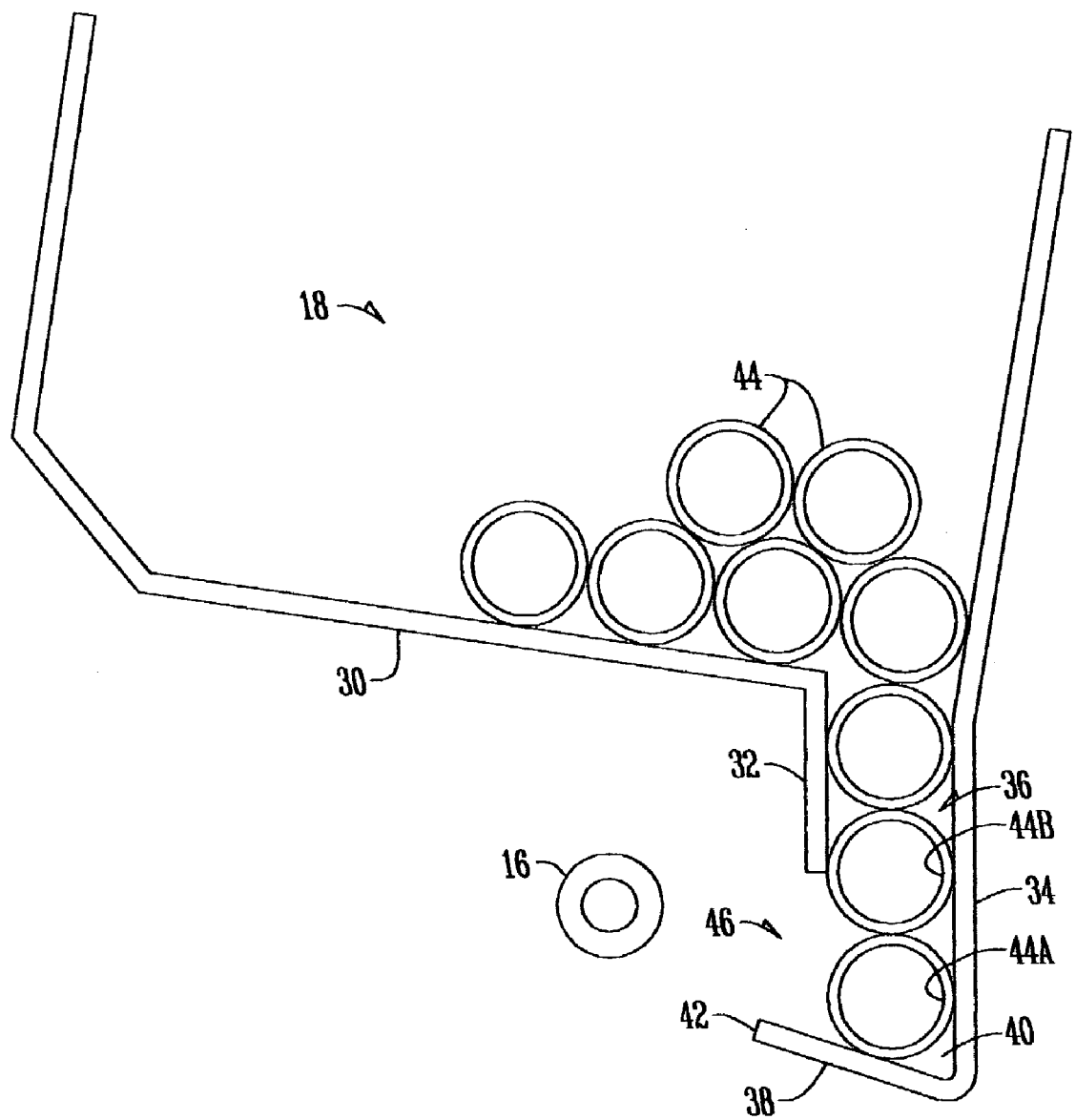
FIG. 3 is a scale cross section of a hopper with a plurality of casings therein.

With reference to FIG. 3, the hopper 18 has an inclined floor 30, which terminates in a downwardly extending fence wall 32. The hopper also includes a chute wall 34, which is parallel to but in spaced relation to fence wall 32. The fence wall 32 and chute wall 34 form a substantially vertical casing passageway 36 there between.

The chute wall 34 terminates in an inclined flange 38 which, extends upwardly and inwardly from the lower end of the chute wall. The flange 38 forms a cradle portion 40, which is adapted to releasably hold the lowermost casing 44A. The flange 38 has an inner elongated edge 42.

Figure 4:
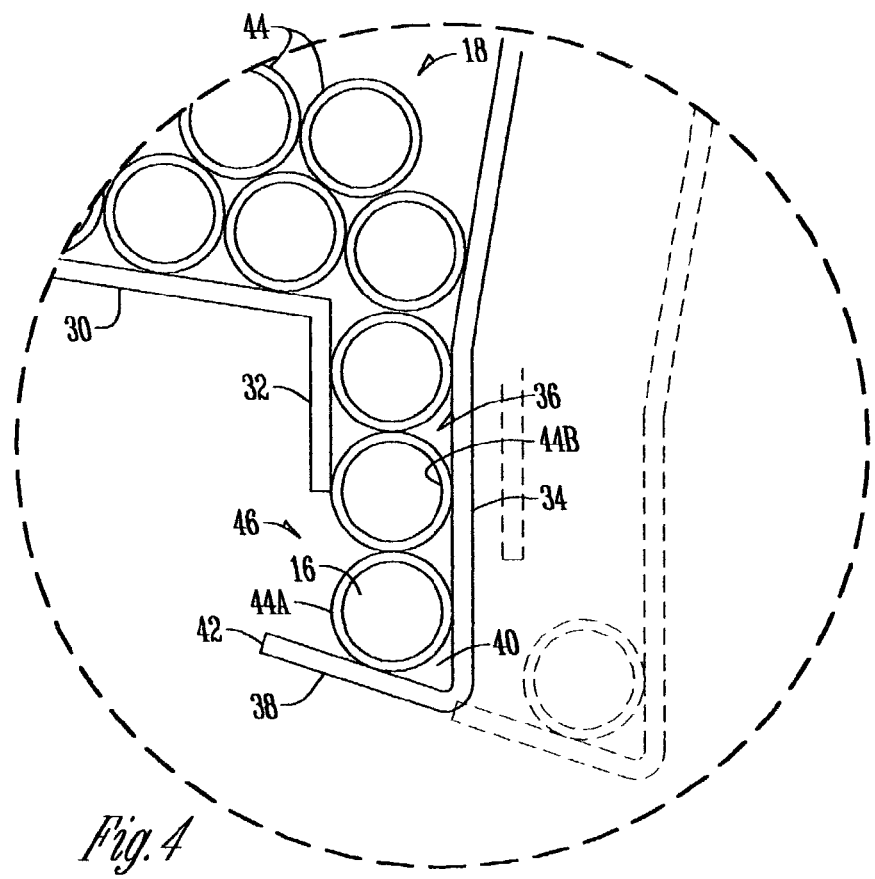
FIG. 4 is a cross sectional view similar to that of FIG. 3 but shows the hopper moved into a position of alignment with the stuffing tube.

A plurality of elongated shirred casings 44 including the previously mentioned bottom casing 44A and the next succeeding casing 44B are placed longitudinally within the hopper as shown in FIG. 4. The numeral 46 designates the space between the flange 38 (and cradle portion 40) and the lower end of the passageway 36 (and the lower end of fence wall 32).

Figure 5:
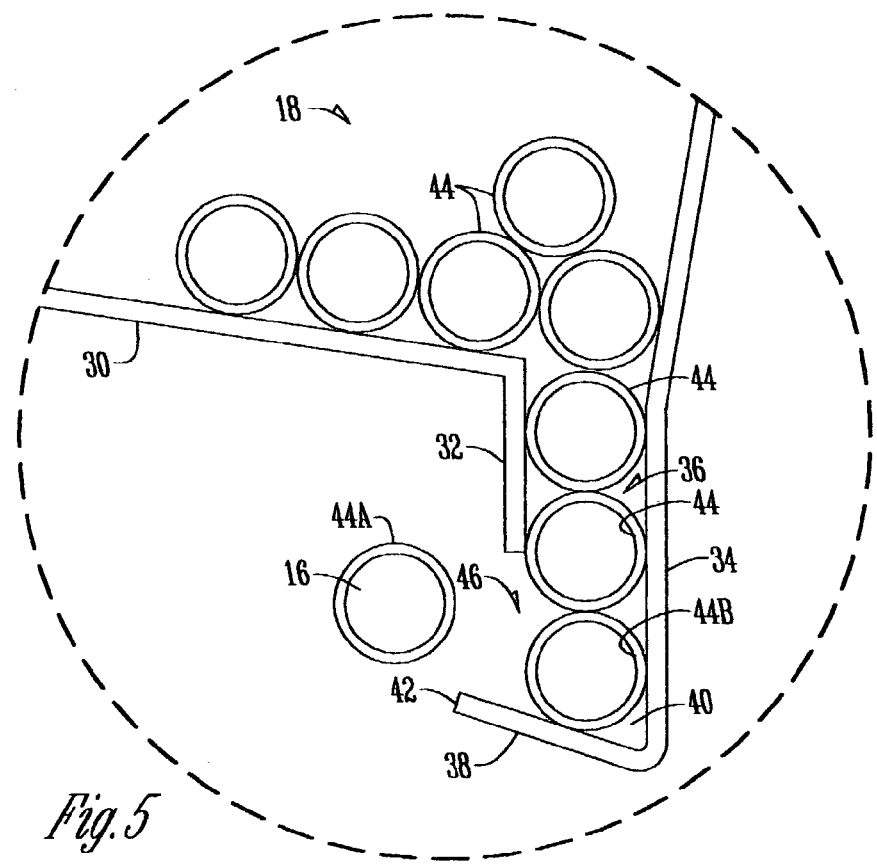
FIG. 5 shows the hopper in a withdrawn position from the stuffing tube after an initial casing has been deposited on the outer surface of the stuffing tube.
Figure 6:
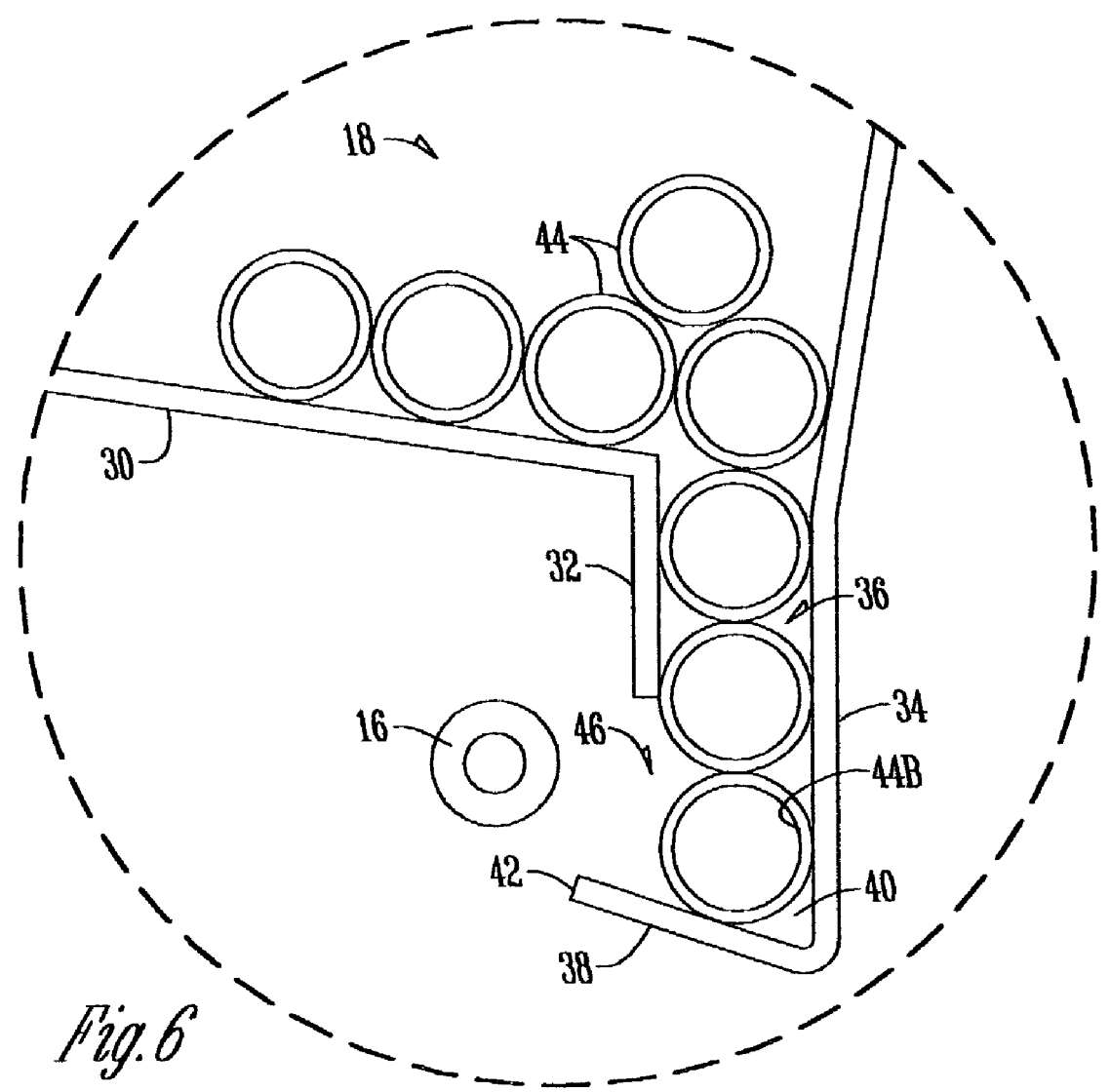
FIG. 6 is a view similar to FIG. 5 but shows the position of the hopper and the stuffing tube after the casing on the stuffing tube has been filled and after an additional casing has entered the cradle of the hopper.

The hopper 18 has at least two functions. The first is to position a casing for loading onto the stuffing tube 16. The second function is to retain the remaining casings in the hopper so that they can be loaded in subsequent machine cycles. These functions are accomplished primarily through the cradle to accurately position the casing for loading, the fence walls 32 and 34, and a linear motion linkage to shuttle the hopper between the loading position and the retracted position. FIG. 7 shows schematically a side elevation of the hopper and the stuffing tube, and their relative positions, as the casings are sequentially removed from the hopper for stuffing purposes. FIGS. 4 through 6 show cross sections through the hopper and the stuffing tube as the steps outlined in FIG. 7 are accomplished.

More specifically, a plurality of casings 44 are placed in the hopper so that a vertical stack of casings is deposited within the passageway 36 to locate a bottom casing 44A in the cradle with the next adjacent casing 44B remaining in the passageway directly above casing 44A. The space 46 is insufficient to allow more than one casing to be removed from the cradle portion 40 at a time.

With the cradle and the stuffing tube being normally positioned as shown in FIG. 3, the hopper is then moved laterally towards the axis of the retracted stuffing tube so that the discharge end 17 of the stuffing tube is in direct axial alignment with the casing 44A in the cradle 40. This is best shown in FIG. 4, and in step B of FIG. 7.

The stuffing tube 16 is then conventionally longitudinally moved forwardly to penetrate the casing 44A. The hopper is then moved, by any conventional means, back away from the stuffing tube 16 as best shown in FIG. 5 and step D of FIG. 7, leaving casing 44A on stuffing tube 16.

The controller then causes pump 14 to move meat emulsion through the stuffing tube 16 to conventionally and sequentially fill the casing 44A with meat emulsion. This process progressively and sequentially removes the casing 44A from the end of stuffing tube 16. The completion of this phase of the process is best shown in FIG. 6 and in step E of FIG. 7.

The stuffing tube 16 is then longitudinally withdrawn to its initial position as shown in step A of FIG. 7 so that the cycle can be repeated.

Figure 10:
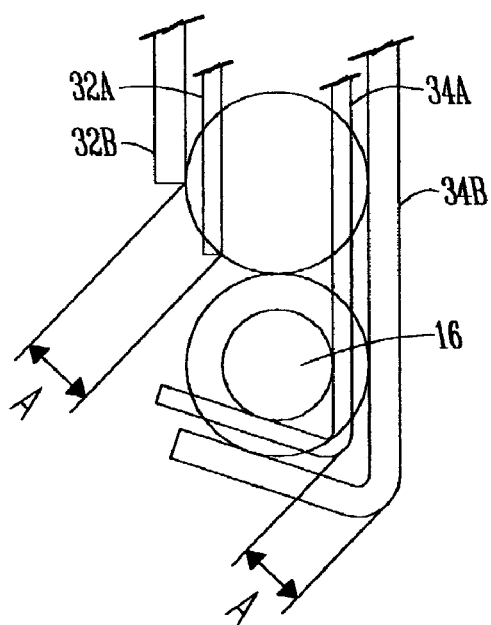
FIG. 10 is a view where both

Whatever sized casing is to be used in the stuffing machine, the lowest casing in the hopper must be aligned with the stuffing tube, as shown in FIG. 10.

Figure 8:
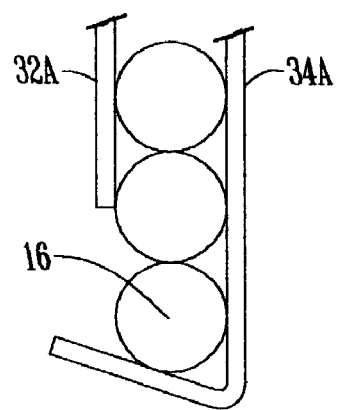
FIG. 8 is an end view of the lower part of the casing hopper showing the hopper set for small casings.
Figure 9:
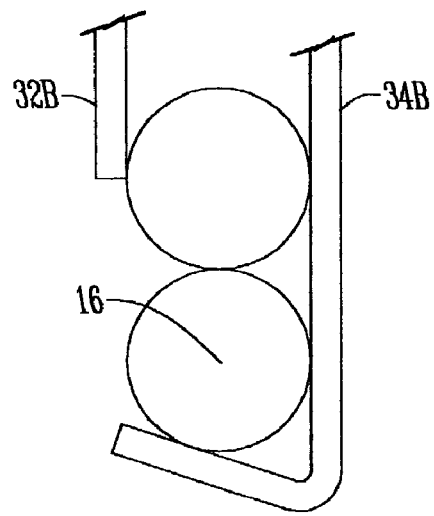
FIG. 9 is a view similar to FIG. 8 to the same scale, with the hopper set for large casings.

To maintain this alignment, the chute wall 34 must move down and away from the axis of the stuffing tube 16 and the fence wall 32 must move up and away from the axis of the stuffing tube 16 as larger casings are used (this applies when the hopper is in the loading position illustrated in FIG. 10). 32A and 34A represent the positions of components set for a small casing and 32B and 34B for when they are set for a larger casing. 16 represents the axis of the stuffing tube in FIGS. 8, 9 & 10. The dimension lines A in FIG. 10 show how the fence wall and the chute wall must move to run small and large casings.

Figure 11:
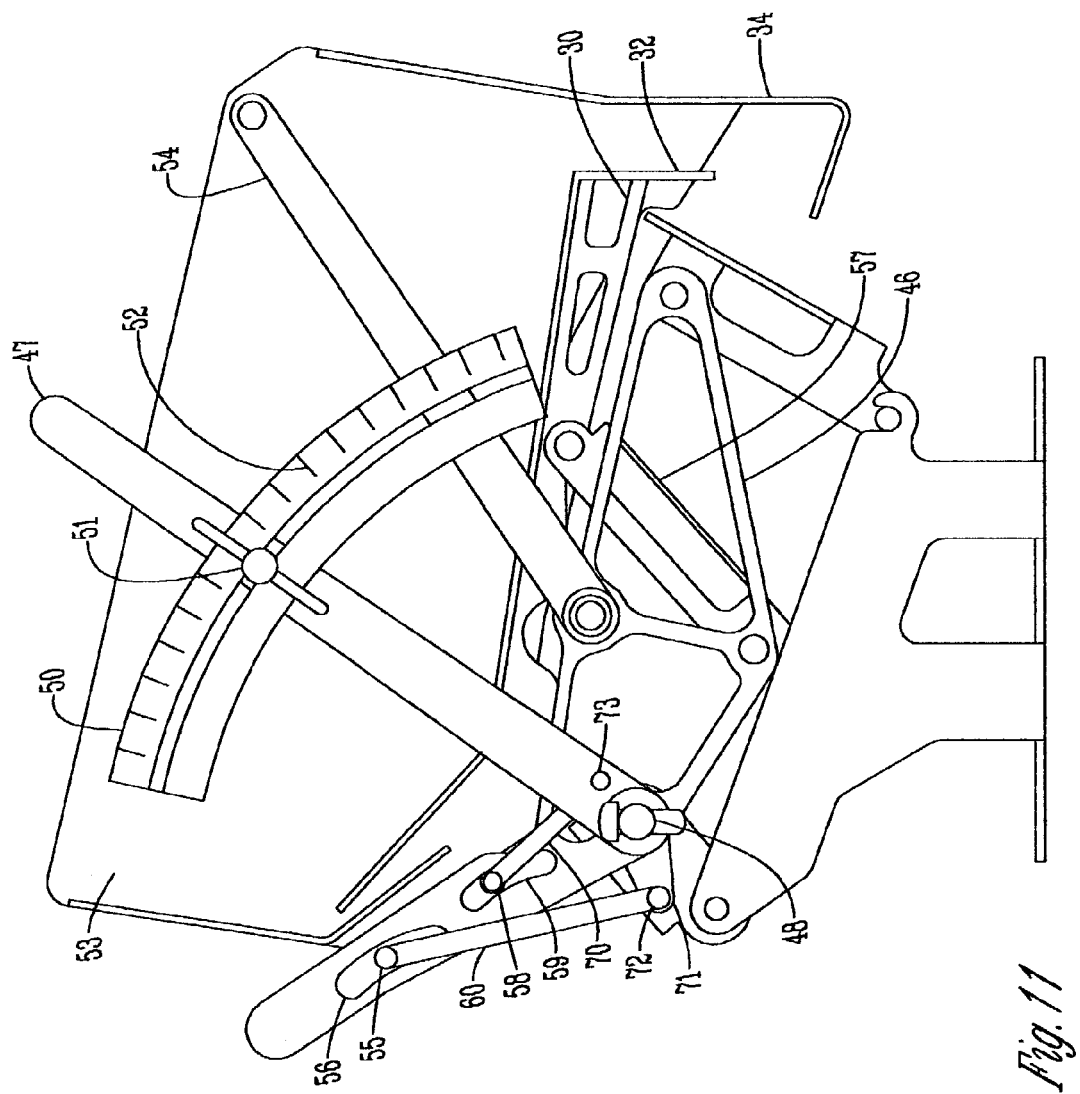
FIGS. 11–13 show side elevations of the invention with the layout of linkage in various positions to provide the size adjustment for casings of varying diameters.
Figure 12:
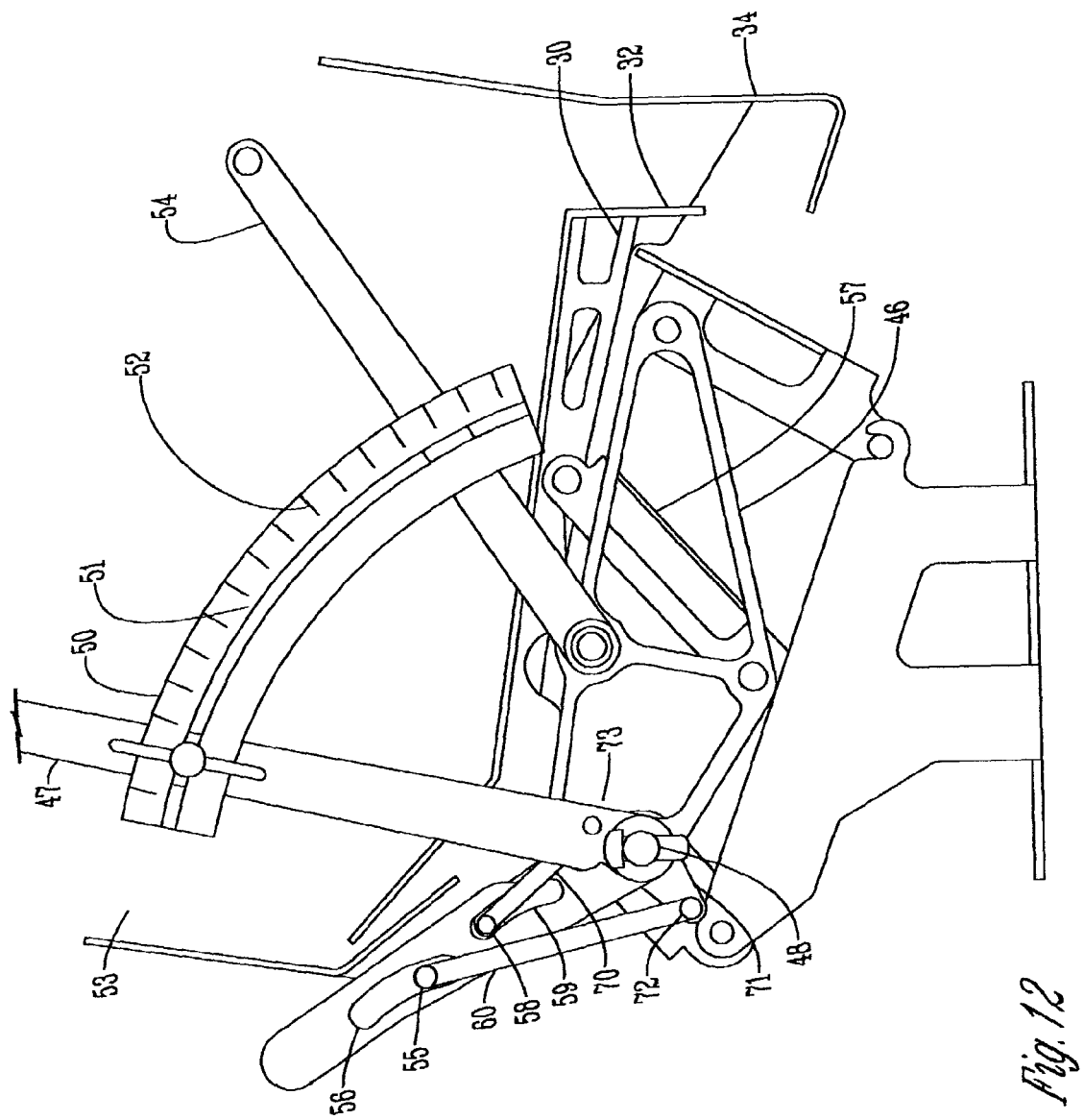
Figure 13:
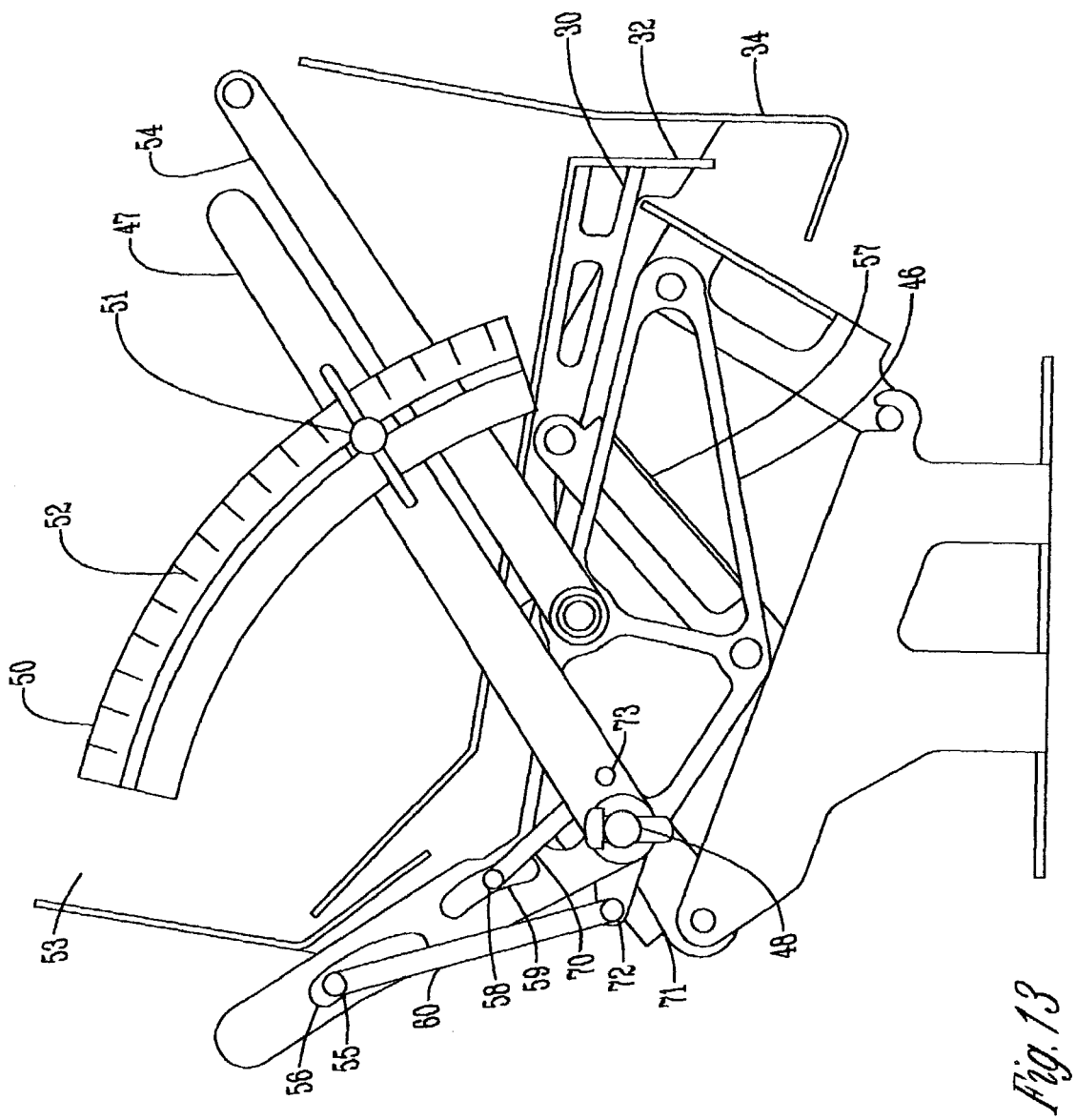

The linkage shown in FIG. 11 is designed so that the positions of the chute wall 34 and fence wall 32 are controlled by a single control lever 47, in a manner to ensure that these positions are correct for all casing sizes within the range of the hopper. This is achieved as follows:

The chute wall 34 is part of the hopper assembly 53, which is constrained in its movement by the link 54 and the spindle 55 moving in slot 56.

The fence wall 32 is attached to the hopper floor 30, which is constrained to move by the link 57 and the spindle 58 sliding in slot 59.

The lower ends of links 54 and 57 are pivotally attached to the sub frame 46.

The control lever 47 is pivotally attached to sub frame 46 on pivot 48 and attached to crank arm 71. The lower ends of links 60 and 70 are attached to the outer ends of crank arm 71 at pivots 72 and 73 respectively.

The positions of all these links and pivots are such that, as the control lever 47 is moved, the chute wall 34 and the fence wall 32 are controlled to be in the correct position for all size casings.

The control lever 47 has a lock 51 to hold it in any desired position. It moves within a guide 50, which has calibration marks 52 which can be related to specific casing sizes.

What is claimed is:

1. A casing hopper for sausage encasing machines for use with casings and a stuffing tube, comprising:
    an adjustable hopper adapted to change size to accommodate casings of various sizes and dispense a bottom casing from an outlet of the hopper; and
    a single control operatively associated with the hopper, the single control adapted to:
    adjust the size of the hopper to accommodate casings of various sizes,
    adjust the size of the hopper outlet to accommodate casings of various sizes, and
    simultaneously maintaining alignment of a center axis of the casing with a center axis of the stuffing tube while the size of the hopper and hopper outlet are adjusted to accommodate casings of various sizes.

2. The casing hopper according to claim 1, wherein the hopper has a downwardly sloping bottom terminating in a downwardly extending fence wall, a chute wall substantially vertically disposed and being in lateral spaced relation to the fence wall to form a substantially vertical passageway, the chute wall terminating in an inclined flange that extends upwardly and inwardly below the passageway to form a cradle portion to receive only a single hollow casing, the passageway being only of sufficient width to receive a plurality of vertically stacked elongated hollow casings, and the flange terminating in an inward elongated edge spaced from a lower end of the fence wall to permit only the single casing in the cradle to be moved relative to the hopper laterally outwardly from the flange beneath the fence wall, when it is on the stuffing tube and the hopper moves away from the stuffing tube position.

3. The casing hopper according to claim 2, wherein the chute wall moves down and away from the axis of the stuffing tube and the fence wall moves up and away from the axis of the stuffing tube as a larger casing is accommodated by the hopper.

4. The casing hopper according to claim 2, wherein the chute wall and the fence wall are adjusted for different sized casings by linkages to a single lever.

5. The casing hopper according to claim 4, wherein the lever can be locked in position when set to run a particular sized casing.

6. The casing hopper according to claim 4, wherein the position of the lever can be calibrated for individual casing sizes.

7. A method for loading casings onto a stuffing tube from a casing hopper, comprising:
providing a hopper which can be adjusted to change size to accommodate casings of various sizes and dispense a bottom casing from an outlet of the hopper;
providing a single control operatively associated with the hopper; and
activating the single control to adjust the size of the hopper to accommodate casings of various sizes, adjust the size of the hopper outlet to accommodate casings of various sizes, and simultaneously maintaining alignment of a center axis of the casing with a center axis of the stuffing tube while the size of the hopper and hopper outlet are adjusted to accommodate casings of various sizes.

8. The method according to claim 7, wherein the hopper has a downwardly sloping bottom terminating in a downwardly extending fence wall, a chute wall substantially vertically disposed and being in lateral spaced relation to the fence wall to form a substantially vertical passageway, the chute wall terminating in an inclined flange that extends upwardly and inwardly below the passageway to form a cradle portion to receive only a single hollow casing, the passageway being only of sufficient width to receive a plurality of vertically stacked elongated hollow casings, and the flange terminating in an inward elongated edge spaced from a lower end of the fence wall to permit only the single casing in the cradle to be moved relative to the hopper laterally outwardly from, the flange beneath the fence wall, when it is on the stuffing tube and the hopper moves away from the stuffing tube position.

9. The method according to claim 8, wherein the chute wall moves down and away from the axis of the stuffing tube and the fence wall moves up and away from the axis of the stuffing tube as a larger casing is accommodated by the hopper.

10. The method according to claim 8, wherein the chute wall and the fence wall are adjusted for different sized casings by linkages to a single lever.

11. The method according to claim 10, wherein the lever can be locked in position when set to run a particular sized casing.

12. The method according to claim 10, wherein the position of the lever can be calibrated for individual casing sizes.

13. A casing hopper for sausage encasing machines, comprising,
a hopper having a downwardly sloping bottom terminating in a downwardly extending fence wall,
a chute wall substantially vertically disposed and being in lateral spaced relation to the fence wall to form a substantially vertical passageway,
the chute wall terminating in an inclined flange that extends upwardly and inwardly below the passageway to form a cradle portion to receive only a single hollow casing,
the passageway being only of sufficient width to receive a plurality of vertically stacked elongated hollow casings,
the flange terminating in an inward elongated edge spaced from a lower end of the fence wall to permit only the single casing in the cradle to be moved relative to the hopper laterally outwardly from the flange beneath the fence wall, when it is on the stuffing tube and the hopper moves away from the stuffing tube position,
wherein the chute wall and the fence wall can be adjusted for different sized casings; and
wherein the chute wall and the fence wall can be adjusted by a single control for dofferemt sized casings.

14. The machine according to claim 13 wherein the chute wall and the fence wall are adjusted for different sized casings by linkages to a single lever.

15. The machine according to claim 14 wherein the lever can be locked in position when set to run a particular sized casing.

16. The machine according to claim 14 wherein the position of the lever can be calibrated for individual casing sizes.

17. A method for loading elongated hollow casings on the outer surface of an elongated hollow sausage stuffing tube, comprising,
providing a hopper having a downwardly sloping bottom terminating in a downwardly extending fence wall,
providing a chute wall substantially vertically disposed and being in lateral spaced relation to the fence wall to form a substantially vertical passageway,
the chute wall terminating in an inclined flange that extends upwardly and inwardly below the passageway to form a cradle portion to receive only a single hollow casing,
the passageway being only of sufficient width to receive a plurality of longitudinally vertically stacked elongated hollow casings,
the flange terminating in an inward elongated edge spaced from a lower end of the fence wall to permit only the single casing in the cradle to be moved laterally outwardly relative to the hopper from the flange beneath the fence wall, when it is on the stuffing tube and the hopper moves away from the stuffing tube position,
placing a plurality of casings in the hopper to create a vertical column in the passageway upwardly from the cradle,
moving the cradle into a position of longitudinal alignment with the discharge end of a sausage stuffing tube,
moving the stuffing tube longitudinally to penetrate the casing in the cradle,
moving the cradle away from the stuffing tube to allow another casing in the passageway to fall into the cradle,
extruding meat emulsion from the tube into the casing that is on the stuffing tube, and
providing a means of adjusting the hopper for different sized casings with a single control.

* * * * *